US012770957B2

(12) United States Patent
Xiao et al.

(10) Patent No.: US 12,770,957 B2
(45) Date of Patent: Oct. 20, 2026

(54) BATTERY AND ELECTRIC APPARATUS

(71) Applicant: CONTEMPORARY AMPEREX TECHNOLOGY (HONG KONG) LIMITED, Hong Kong (CN)

(72) Inventors: Haihe Xiao, Ningde City (CN); Xiaowen Zhang, Ningde City (CN); Xigen Zhou, Ningde City (CN); Yong Tao, Ningde City (CN); Shuangjuan Peng, Ningde City (CN); Yaping Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 677 days.

(21) Appl. No.: 18/211,099

(22) Filed: Jun. 16, 2023

(65) Prior Publication Data

US 2023/0335831 A1 Oct. 19, 2023

Related U.S. Application Data

(63) Continuation of application No. PCT/CN2022/098444, filed on Jun. 13, 2022.

(30) Foreign Application Priority Data

Jul. 30, 2021 (CN) ......................... 202110875714.7

(51) Int. Cl.
*H01M 10/6557* (2014.01)
*H01M 10/6568* (2014.01)
(Continued)

(52) U.S. Cl.
CPC ... *H01M 10/6557* (2015.04); *H01M 10/6568* (2015.04); *H01M 50/209* (2021.01); *H01M 50/375* (2021.01)

(58) Field of Classification Search
CPC ............. H01M 50/375; H01M 10/647; H01M 10/613; H01M 10/6569; H01M 10/6568; H01M 50/209; H01M 10/6557
See application file for complete search history.

(56) References Cited

FOREIGN PATENT DOCUMENTS

| | | |
|---|---|---|
| CN | 101552351 A | 10/2009 |
| CN | 103066342 A | 4/2013 |

(Continued)

OTHER PUBLICATIONS

Contemporary Amperex Technology Co., Limited, International Search Report and Written Opinion, PCT/CN2022/098444, Aug. 23, 2022, 10 pgs.

(Continued)

*Primary Examiner* — Sarah A. Slifka
(74) *Attorney, Agent, or Firm* — XSENSUS LLP

(57) ABSTRACT

Embodiments of this application provide a battery and an electric apparatus, where the battery includes: a plurality of battery cells; a heat exchange pad, disposed between two adjacent battery cells and configured to exchange heat with the battery cells; and a cooling pipe, configured to deliver cooling fluid, and the cooling pipe is provided with a plurality of outlets. The heat exchange pad is provided with inlets corresponding to the outlets, and the cooling pipe is configured to deliver the cooling fluid to the inlets of the heat exchange pad through the outlets. A flow channel that communicates with the inlets is further provided on the heat exchange pad, and the flow channel is configured to accommodate the cooling fluid to exchange heat between the cooling fluid and the battery cells. The technical solutions of the embodiments of this application can enhance the safety of the battery.

20 Claims, 6 Drawing Sheets

2

(51) Int. Cl.
*H01M 50/209* (2021.01)
*H01M 50/375* (2021.01)

(56) References Cited

FOREIGN PATENT DOCUMENTS

| | | | |
|---|---|---|---|
| CN | 106654450 | A | 5/2017 |
| CN | 108520991 | A | 9/2018 |
| CN | 112018300 | A | 12/2020 |
| CN | 112103443 | A | 12/2020 |
| CN | 112448066 | A | 3/2021 |
| CN | 212967883 | U | 4/2021 |
| CN | 112910102 | A | 6/2021 |
| CN | 113113700 | A | 7/2021 |
| DE | 102019216050 | A1 | 4/2021 |
| EP | 3764454 | A1 | 1/2021 |
| JP | 2019-035572 | A | 3/2019 |
| JP | 2021096997 | A | 6/2021 |
| WO | WO2018218502 | A1 | 12/2018 |
| WO | 2020/009997 | A1 | 1/2020 |

OTHER PUBLICATIONS

First Office Action, CN202110875714.7, Apr. 22, 2023, 5 pgs.
First Office Action issued Apr. 22, 2023 in Chinese Patent Application No. 202110875714.7 with English translation.
Notification to Grant Patent Right for Invention issued Jul. 17, 2023 in Chinese Patent Application No. 202110875714.7 with English translation.
Extended European Search Report issued Dec. 17, 2024 in European Patent Application No. 22848071.1.

BATTERY AND ELECTRIC APPARATUS

CROSS-REFERENCE TO RELATED APPLICATIONS

This application is a continuation of PCT Patent Application No. PCT/CN2022/098444, entitled "BATTERY AND ELECTRIC APPARATUS" filed on Jun. 13, 2022, which claims priority to Chinese Patent Application No. 202110875714.7, entitled "BATTERY AND ELECTRIC APPARATUS" filed on Jul. 30, 2021, all of which is incorporated herein by reference in its entirety.

TECHNICAL FIELD

This application relates to the field of battery technologies, and in particular, to a battery and an apparatus using the battery.

BACKGROUND

With the development of economy, battery technologies have been widely used in various fields, and in particular, in the field of transportation such as the field of electric vehicles. Thermal safety of a battery is a top priority for electric vehicles and energy storage systems. Once thermal runaway in a battery cell spreads to the entire battery system, a major safety accident occurs. Therefore, how the problem of occurrence and spreading of thermal runaway in a battery cell is resolved to improve the safety of battery is of great research significance and value.

SUMMARY

Embodiments of this application provide a battery and an apparatus using the battery, to enhance safety of the battery.

According to a first aspect, an embodiment of this application provides a battery, including: a plurality of battery cells; a heat exchange pad, disposed between two adjacent battery cells; and a cooling pipe, configured to deliver cooling fluid, where the cooling pipe is provided with a plurality of outlets. The heat exchange pad is provided with inlets corresponding to the outlets, and the cooling pipe is configured to deliver the cooling fluid to the inlets of the heat exchange pad through the outlets. A flow channel that communicates with the inlets is further provided on the heat exchange pad, and the flow channel is configured to accommodate the cooling fluid to exchange heat between the cooling fluid and the battery cells.

In technical solutions of this embodiment of this application, when temperatures of one or more battery cells are abnormal, the cooling fluid can be delivered to the flow channel of the heat exchange pad through the cooling pipe. The cooling fluid in the flow channel exchanges heat with the battery cells and absorbs heat to vaporize, taking away the heat released when the temperatures of the battery cells are abnormal, so as to rapidly cool down the battery cells. This further prevents the battery cells in thermal runaway from catching fire or exploding, or even thermal runaway from spreading to adjacent battery cells, so as to ensure overall safety of the battery.

In some embodiments, the flow channel includes a first flow channel disposed in a length direction of the heat exchange pad and a second flow channel disposed in a height direction of the heat exchange pad. The length direction of the heat exchange pad is perpendicular to the height direction of the heat exchange pad, and the first flow channel communicates with the second flow channel.

Both the first flow channel in the length direction and the second flow channel in a height direction are provided on the heat exchange pad, so that the cooling fluid can flow to regions of the heat exchange pad through the first flow channel and the second flow channel, with even distribution. In this way, the heat exchange pad can have a relatively large cooling area, thereby enhancing a cooling effect of the heat exchange pad.

In some embodiments, the flow channel includes a plurality of second flow channels, and the plurality of second flow channels are spaced apart in the length direction of the heat exchange pad.

The second flow channels are spaced apart in the length direction of the heat exchange pad so that the heat exchange pad can retain part of pad body. This part of pad body may make the heat exchange pad have a specific structural strength. When the battery cell swells and compresses the heat exchange pad, the second flow channels can maintain flowing space under the support of the part of pad body.

In some embodiments, an exhaust channel is provided between adjacent second flow channels, and the exhaust channel is configured to exhaust gas formed when the cooling fluid is vaporized.

The exhaust channel is provided so that gas formed when the cooling fluid is vaporized can be exhausted in a timely manner, so as to reduce gas obstruction when water enters the heat exchange pad and keep the water entering the heat exchange pad unobstructed.

In some embodiments, in the height direction of the heat exchange pad, the first flow channel is provided on a side that is of the second flow channel and that is close to the cooling pipe, where the first flow channel communicates with the inlets of the heat exchange pad.

The first flow channel is provided on the side that is of the second flow channel and that is close to the cooling pipe, and the first flow channel communicates with the inlets of the heat exchange pad, so that the cooling fluid flowing from the inlets can first flow in the length direction of the heat exchange pad through the first flow channel and then flow to the second flow channel.

In some embodiments, the flow channel further includes a third flow channel disposed in the height direction of the heat exchange pad. In the height direction of the heat exchange pad, the third flow channel is provided on a side that is of the first flow channel and that is close to the cooling pipe. The third flow channel communicates with the inlets of the heat exchange pad, and the cooling fluid flows into the first flow channel through the third flow channel.

The third flow channel is provided on the side that is of the first flow channel and that is close to the cooling pipe, so that the third flow channel serves as a flow channel that communicates with the inlets. After flowing out of the inlets, the cooling fluid can first flow along the third flow channel, that is, along the height direction of the heat exchange pad, and then flow into the first flow channel.

In some embodiments, the heat exchange pad includes a plurality of through holes, and at least some through holes are provided on a periphery of the flow channel.

Through holes are provided on the heat exchange pad so that the cooling fluid flowing into the heat exchange pad can spread through the through holes to enlarge the heat exchange area, thereby enhancing the cooling effect. In addition, at least some through holes are provided on the periphery of the flow channel, so that some cooling fluid after heat exchange in the flow channel can enter the through holes for a second round of heat exchange, and the gas formed when the cooling fluid is vaporized can be exhausted through the through holes.

In some embodiments, the flow channel is formed by recessing a surface of the heat exchange pad opposite the battery cell.

The flow channel is formed by recessing a surface of the heat exchange pad opposite the battery cell so that the cooling fluid flowing into the flow channel is easy to exchange heat with the battery cells, thereby improving heat exchange efficiency. In addition, using a surface of the battery cell as a part of the flow channel to form a flow channel helps save materials.

In some embodiments, the battery further includes a flexible connector, and the flexible connector is configured to connect the outlets of the cooling pipe and the inlets of the heat exchange pad.

The flexible connector is configured to connect the outlets of the cooling pipe and the inlets of the heat exchange pad so that the outlets of the cooling pipe and the inlets of the heat exchange pad are not easily detached when relative displacement occurs and the heat exchange pad can still function normally when the battery cell is swollen.

In some embodiments, the cooling pipe is further provided with a thermal sensitive seal for sealing the outlets, and the thermal sensitive seal is configured to be broken when a temperature of the battery cell reaches a threshold, so as to communicate the outlet with the inlet and to allow the cooling fluid to flow into the flow channel to cool the battery cell.

The thermal sensitive seal for sealing the outlet is provided at the outlet of the cooling pipe so that when the battery cell functions normally, the cooling fluid cannot flow into the heat exchange pad for cooling, and when the temperature of the battery cell is abnormal and the thermal sensitive seal is broken, the cooling fluid flows into the heat exchange pad for cooling, convenient for use.

In some embodiments, the battery cell includes an explosion-proof valve, the cooling pipe is disposed in a periphery of the explosion-proof valve, and the explosion-proof valve is configured to be actuated when the temperature of the battery cell reaches the threshold and break the thermal sensitive seal.

The cooling pipe is disposed in the periphery of the explosion-proof valve so that the thermal sensitive seal disposed in the cooling pipe can be broken by concentrated heat generated when the explosion-proof valve is actuated, to allow the cooling fluid to flow into the heat exchange pad for cooling, or to prevent heat from the battery cell in thermal runaway from spreading to normally functioning battery cells.

According to a second aspect, an embodiment of this application provides an apparatus using a battery, including the battery according to the first aspect, where the battery is configured to provide electric energy.

BRIEF DESCRIPTION OF DRAWINGS

To describe the technical solutions in the examples of this application more clearly, the following briefly describes the accompanying drawings required for describing the examples of this application. Apparently, the accompanying drawings in the following descriptions show merely some examples of this application, and persons of ordinary skill in the art may still derive other drawings from the accompanying drawings without creative efforts.

REFERENCE SIGNS

Figure 1:
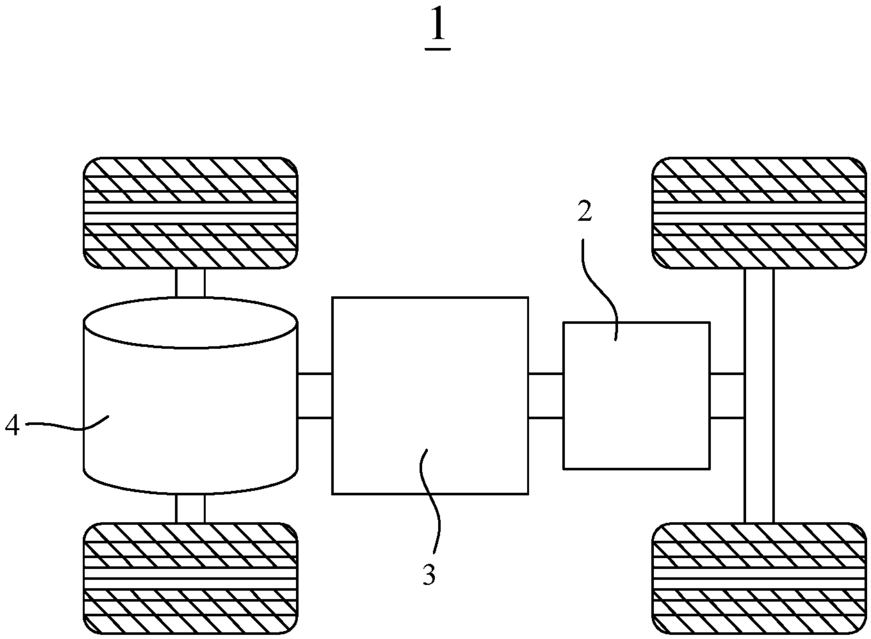
FIG. 1 is a schematic structural diagram of a vehicle according to some embodiments of this application.

1. vehicle; 2. battery; 3. controller; 4. motor; 5. box; 51. first box portion; 52. second box portion; 53. accommodating space; 21. battery cell; 22. heat exchange pad; 23. cooling pipe; 24. flexible connector; 211. explosion-proof valve; 221. inlet; 222. flow channel; 231. outlet; 232. thermal sensitive seal; 222*a*. first flow channel; 222*b*. second flow channel; 222*c*. exhaust channel; 222*d*. third flow channel; X. length direction of the heat exchange pad; Y. thickness direction of the heat exchange pad; Z. height direction of the heat exchange pad; and S. surface of the heat exchange pad opposite to the battery cell.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

The following further describes implementations of this application in detail with reference to accompanying drawings and embodiments. The detailed description of the following embodiments and the accompanying drawings are used to exemplarily illustrate the principle of this application, but cannot be used to limit the scope of this application, that is, this application is not limited to the described embodiments.

In the descriptions of this application, it should be noted that, unless otherwise stated, “plurality” means two or more; and the orientations or positional relationships indicated by the terms “upper”, “lower”, “left”, “right”, “inside”, “outside”, and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first" and "second" are merely intended for a purpose of description, and shall not be understood as an indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of the application. In the descriptions of this application, it should be further noted that unless otherwise specified and defined explicitly, the terms "installment", "link", and "connection" should be understood in their general senses. For example, the terms may be a fixed connection, a detachable connection, or an integrated connection, or may be a direct connection, or an indirect connection through an intermediate medium. Persons of ordinary skill in the art can understand specific meanings of these terms in this application as appropriate to specific situations.

The coordinate systems in the following figures have a same definition, where in the coordinate systems, direction X refers to a length direction of a heat exchange pad, direction Y refers to a thickness direction of the heat exchange pad, and direction Z refers to a height direction of the heat exchange pad. The direction X, direction Y, and direction Z appear in the following descriptions have the same meaning as defined above.

Currently, from a perspective of market development, application of electric vehicle batteries is becoming more and more extensive. Electric vehicle batteries are widely used not only in energy storage power supply systems such as hydro, thermal, wind, and solar power plants, but also in electric transportation tools such as electric bicycles, electric motorcycles, electric vehicles, and fields such military equipment and aerospace. With continuous expansion of application fields of electric vehicle batteries, market demands for the electric vehicle batteries are also increasing.

In the field of electric vehicles such as electromobiles, as a core component in a vehicle, traction battery is related to safety of the vehicle. Thermal runaway of the traction battery is the most severe safety accident. Thermal runaway means that a heat generation rate of the chemical reaction in a battery cell is much higher than a heat dissipation rate, and a large amount of heat accumulates inside the battery cell, causing the temperature of the battery cell to rise rapidly and finally resulting in that the battery cell catches fire or explodes, directly threatening safety of a user.

The applicants have found that when thermal runaway occurs in a single battery cell of a battery, a higher temperature of the battery cell housing indicates faster thermal diffusion between battery cells. This means that adjacent battery cells will also be affected by the single battery cell to heat up faster and trigger thermal runaway one after another, resulting in a decrease in an overall safety factor of the battery.

Based on the above considerations, a battery is provided in this application. The battery includes a cooling pipe and a heat exchange pad provided between adjacent battery cells and configured to exchange heat with the battery cells. The heat exchange pad is further provided with a flow channel for accommodating cooling fluid, and the cooling fluid in the flow channel can exchange heat with the battery cells, so as to reduce probability of battery fire or explosion caused by thermal runaway of the battery cells, thereby enhancing safety of the battery.

The battery cell described in the embodiments of this application is applicable to a battery and an electric apparatus using the battery.

The electric apparatus may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, and an electric toy airplane. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

For ease of description, the electric apparatus being a vehicle is used as example for description of the following embodiments.

Refer to FIG. 1. FIG. 1 is a schematic structural diagram of a vehicle 1 according to some embodiments of this application. As shown in FIG. 1, a battery 2 is provided inside the vehicle 1, the battery 2 refers to a single physical module that includes one or more battery cells to provide higher voltage and capacity. For example, the battery 2 mentioned in this application may include a battery module or a battery pack. The battery 2 can be provided at the bottom, head, or tail of the vehicle 1. The battery 2 may be configured to supply power to the vehicle 1. For example, the battery 2 may be used as an operational power supply for the vehicle 1. The vehicle 1 may further include a controller 3 and a motor 4, and the controller 3 is configured to control the battery 2 to supply power to the motor 4, for example, to satisfy a working electricity need during start, navigation, and driving of the vehicle 1.

In some embodiments of this application, the battery 2 can be used as not only the operational power supply for the vehicle 1 but also a driving power supply for the vehicle 1, replacing all or a part of the fossil fuel or the natural gas to provide driving power for the vehicle 1.

Figure 2:
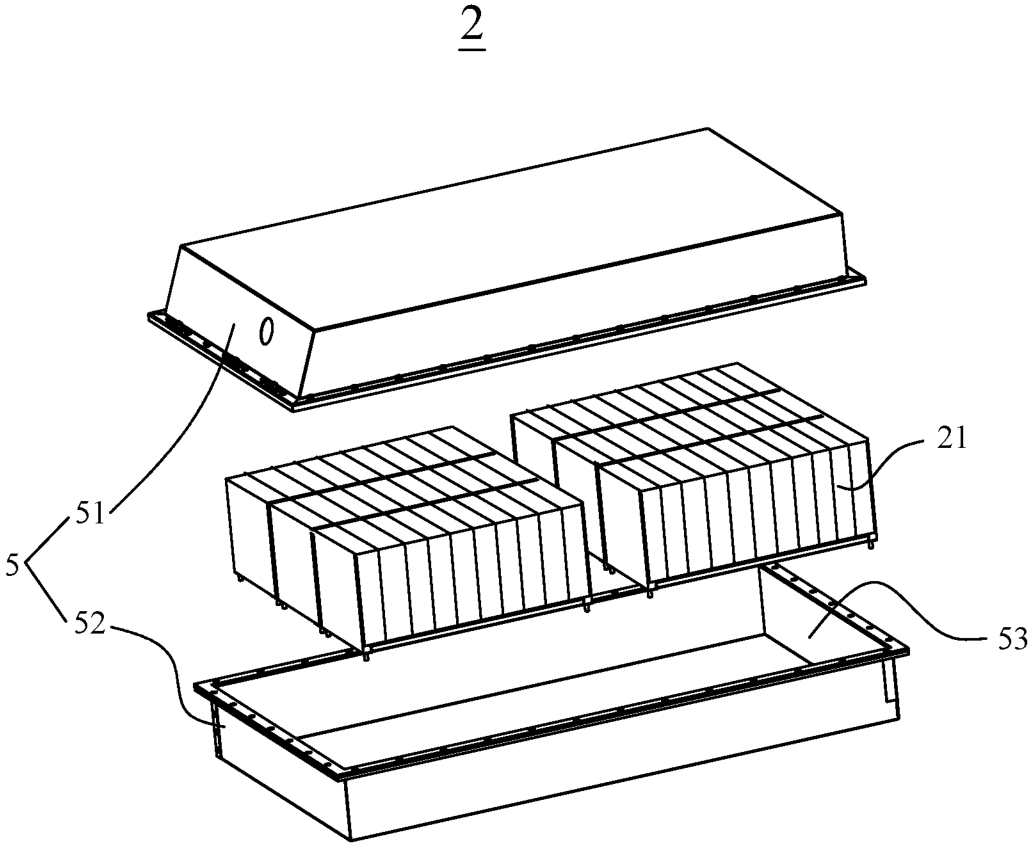
FIG. 2 is a schematic exploded view of a battery according to some embodiments of this application.

Refer to FIG. 2. FIG. 2 is a schematic exploded view of the battery 2 according to some embodiments of this application.

As shown in FIG. 2, the battery 2 includes a box 5 and a battery cell 21, and the battery cell 21 is accommodated in the box 5.

The box 5 is configured to accommodate the battery cell 21, and the box 5 may have various structures. In some embodiments, the box 5 may include a first box portion 51 and a second box portion 52. The first box portion 51 and the second box portion 52 fit together, and jointly define an accommodating space 53 for accommodating the battery cell 21. The second box portion 52 may be a hollow structure with one end open, the first box portion 51 is a plate-shaped structure, and the first box portion 51 covers the opening side of the second box portion 52 so as to form the box 5 having the accommodating space 53. Alternatively, the first box portion 51 and the second box portion 52 may both be a hollow structure with one side open, and the opening side of the first box portion 51 is engaged with the opening side of the second box portion 52 so as to form the box 5 having the accommodating space 53. Certainly, the first box portion 51 and the second box portion 52 may be in various shapes, such as cylinder and cuboid.

In order to improve the sealing performance after the connection of the first box portion 51 and the second box portion 52, a sealing element such as sealing gum or sealing ring may also be disposed between the first box portion 51 and the second box portion 52.

It is assumed that the first box portion 51 fits on a top of the second box portion 52, the first box portion 51 may also be referred to as an upper box cover, and the second box portion 52 may also be referred to as a lower box.

In the battery 2, there are a plurality of battery cells 21. The plurality of battery cells 21 may be connected in series, parallel, or series-parallel, where being connected in series-parallel means a combination of series and parallel connections of the plurality of battery cells 21. The plurality of battery cells 21 may be directly connected in series, parallel, or series and parallel, and a whole constituted by the plurality of battery cells 21 is accommodated in the box 5. Certainly, the plurality of battery cells 21 may first be connected in series, parallel, or series and parallel to constitute a battery group, and then a plurality of battery groups are connected in series, parallel, or series and parallel to constitute a whole, and accommodated in the box 5.

In some embodiments of this application, refer to FIG. 3 to FIG. 7. The battery 2 includes a plurality of battery cells 21, a heat exchange pad 22, and a cooling pipe 23. The heat exchange pad 22 is disposed between two adjacent battery cells 21 and is configured to exchange heat with the battery cells 21. The cooling pipe 23 is provided with a plurality of outlets 231, the heat exchange pad 22 is provided with inlets 221 corresponding to the outlets 231, and the cooling pipe 23 is configured to deliver the cooling fluid to the inlets 221 of the heat exchange pad 22 from the outlets 231. In addition, the heat exchange pad 22 is further provided with a flow channel 222 communicating with the inlets 221, where the flow channel 222 is configured to accommodate the cooling fluid to exchange heat with the battery cell 21.

Figure 3:
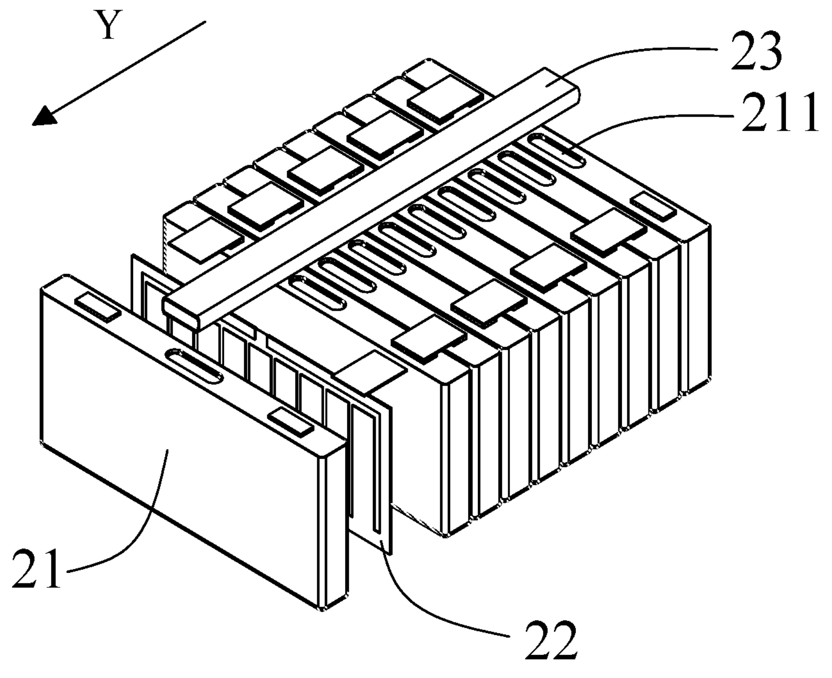
FIG. 3 is a schematic exploded diagram of some components of a battery according to some embodiments of this application.

Refer to FIG. 3. FIG. 3 is a schematic exploded diagram of some components of the battery 2 according to some embodiments of this application. The battery cell 21 refers to the smallest unit that forms a battery. In some embodiments of this application, the battery cell 21 may include a lithium-ion secondary battery cell, a lithium-ion primary battery cell, a lithium-sulfur battery cell, a sodium-lithium-ion battery cell, a sodium-ion battery cell, a magnesium-ion battery cell, and the like. This is not limited in this embodiment of this application. The battery cell 21 may be in a cylinder, a flat body, a cuboid, or another shape, and this is also not limited in the embodiments of this application. For ease of description, a cuboid-shaped battery cell 21 is used as an example in the following embodiments. The battery cells 21 are typically divided into three types by packaging method: cylindrical battery cell, square battery cell, and soft pack battery cell. This is not limited in this embodiment of this application either.

Still refer to FIG. 3. The heat exchange pad 22 is disposed between two adjacent battery cells 21 and configured to exchange heat with the adjacent battery cells 21 to reduce temperatures of the battery cells 21. In some embodiments of this application, the heat exchange pad 22 may be flat-plate shaped, and the flow channel 222 may be provided in the plate body. The flat-plate shaped heat exchange pad 22 may avoid stress concentration when the battery cell 21 swells. In addition, the heat exchange pad 22 may alternatively be a plate with grooves or other structures on a surface, which is not limited in this application. The heat exchange pad 22 can be made of a material that is conducive to diffusion and penetration of the cooling fluid, such as silica aerogel, porous rubber, or porous ceramics. In this way, the cooling fluid is conducive to diffuse in the heat exchange pad 22 when flown into the flow channel, so that the heat exchange pad 22 can have a larger heat exchange area, thereby increasing heat exchange rate between the cooling fluid and the battery cell 21. In addition, part of the structure of the heat exchange pad 22, such as a wall layer that is on the flow channel 222 and that is away from a to-be-cooled battery cell 21, may have better compressibility. When thermal runaway occurs on the battery cell 21, or in a charge/discharge process, the battery cell 21 will swell or shrink. In this case, the heat exchange pad 22 may achieve a function of buffering through its own deformation, so as to reduce a change in the length of the grouped battery cells 21 in a stacking direction (parallel to the thickness direction Y of the heat exchange pad 22) of the plurality of battery cells 21.

Still refer to FIG. 3. The cooling pipe 23 may be configured to deliver the cooling fluid. In some embodiments of this application, the cooling fluid is a substance with low boiling point and high heat absorption, and is volatile. For example, the cooling fluid can be one of deionized water, ethylene glycol, propanol, hydrocarbon fluoride, or a combination of them. The cooling fluid in the flow channel 222 can exchange heat with the battery cells 21, is vaporized and exhausted after heat absorption, so as to increase heat exchange rate with the battery cell 21, thereby achieving a better cooling effect. There may be one or a plurality of cooling pipes 23 disposed for delivering the cooling fluid to a same heat exchange pad 22. When a plurality of cooling pipes 23 are provided for delivering the cooling fluid to the same heat exchange pad 22, a plurality of inlets 221 may be provided on the heat exchange pad 22. The cooling pipe 23 may be in a tubular structure such as a straight pipe or a curved pipe. Optionally, the cooling pipe 23 may be a pipe with a circular section, and a pipe diameter may be designed based on the length of the grouped battery cells 21 and a traffic of the cooling fluid. In addition, the section of the cooling pipe 23 may alternatively be flat or in another shape. This is not limited in this application. The cooling pipe 23 may be provided on any end surface of the battery cells 21. For example, the cooling pipe 23 may be provided on an end surface that is of the battery cells 21 and that is disposed upwards, so that the cooling fluid is easier to flow in to the heat exchange pad 22 from the cooling pipe 23.

Figure 4:
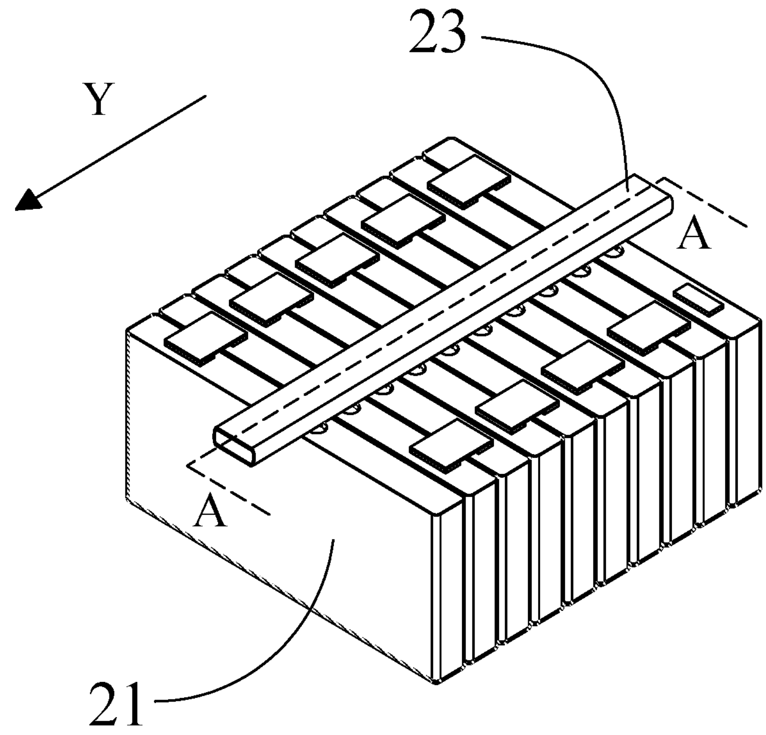
FIG. 4 is a schematic assembly diagram of FIG. 3.
Figure 5:
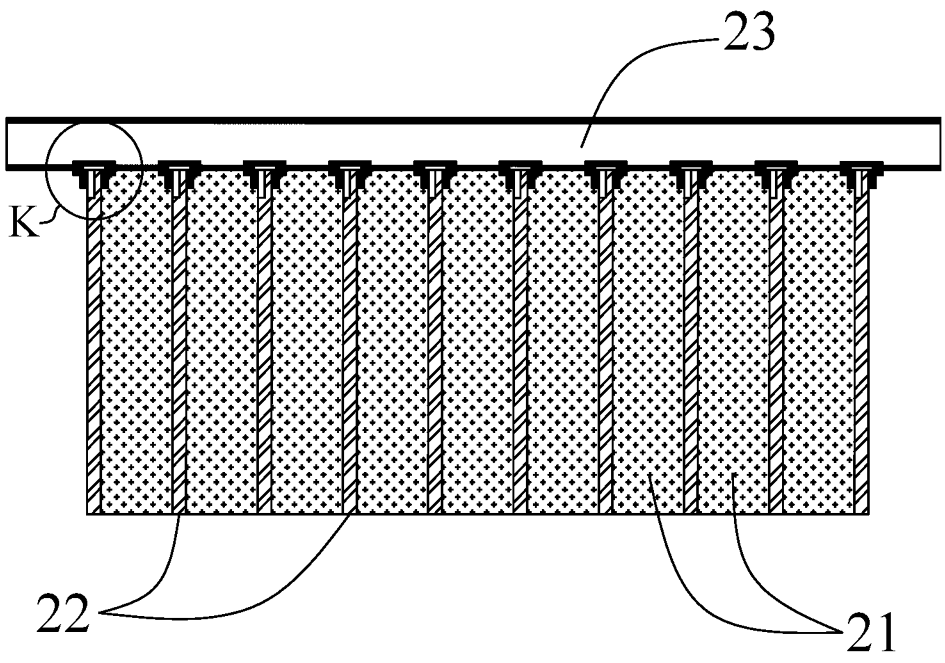
FIG. 5 is a sectional view of FIG. 4 along A-A.
Figure 6:
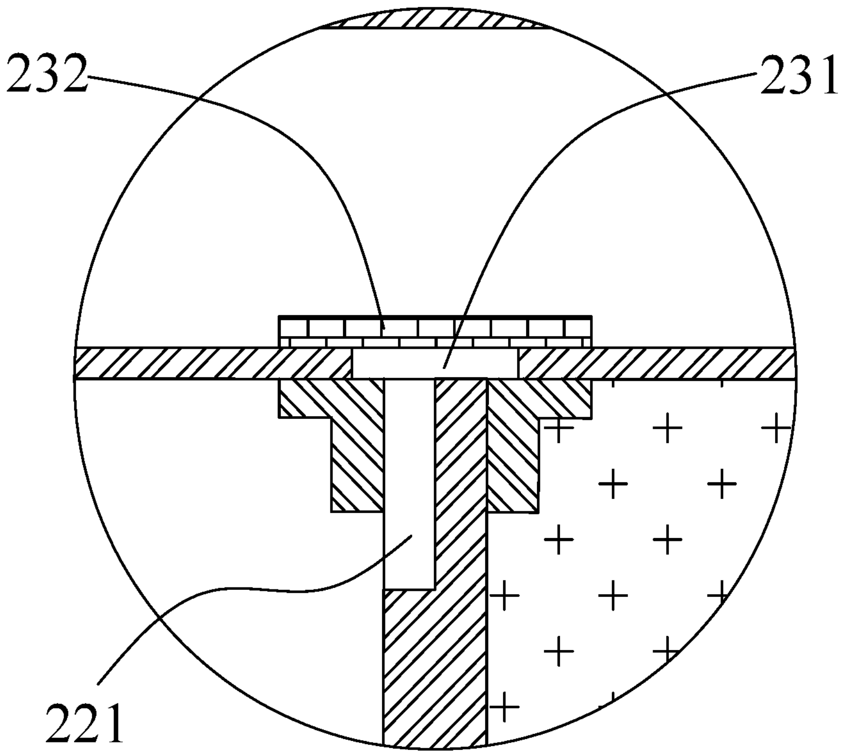
FIG. 6 is a locally enlarged view of a location Kin FIG. 5.

Refer to FIG. 4, FIG. 5, and FIG. 6. FIG. 4 is a schematic assembly diagram of the cooling pipe 23 and the heat exchange pad 22 according to some embodiments of this application. FIG. 5 is a sectional view of FIG. 4 along A-A. FIG. 6 is a locally enlarged view of a location K in FIG. 5. A plurality of outlets 231 may be provided on the cooling pipe 23, and inlets 221 corresponding to the outlets 231 are provided on the heat exchange pad 22. One outlet 231 on the cooling pipe 23 may be provided corresponding to one inlet 221 of the heat exchange pad 22. Alternatively, a plurality of outlets 231 on the cooling pipe 23 may be provided corresponding to one inlet 221 on the heat exchange pad 22. When a plurality of cooling pipes 23 are provided for delivering the cooling fluid to the same heat exchange pad 22, a plurality of inlets 221 may be provided on the heat exchange pad 22, and the inlets 221 are in a one-to-one correspondence with the outlets 231. Shapes and sizes of the outlets 231 and inlets 221 are not limited, and may be designed depending on a traffic requirement for the cooling fluid and a cooling reaction time. In some embodiments of this application, the outlet 231 on the cooling pipe 23 may be arranged downwards, so that the cooling fluid flowing in the cooling pipe 23 is easy to flow to the inlets 221 of the heat exchange pad 22 from the outlets 231.

Figure 7:
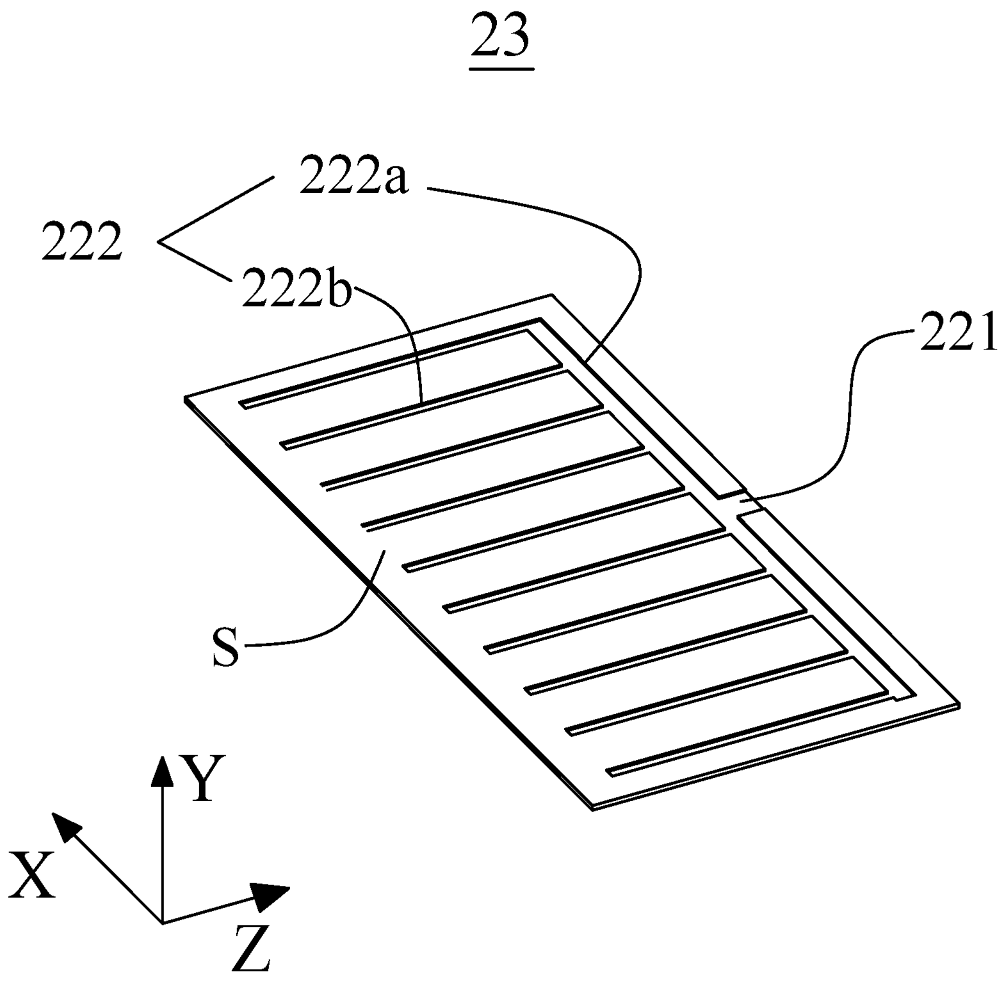
FIG. 7 is a schematic structural diagram of a heat exchange pad according to some embodiments of this application.

Refer to FIG. 7. FIG. 7 is a schematic structural diagram of a heat exchange pad 22 according to some embodiments of this application. A flow channel 222 that communicates with the inlet 221 is further provided on the heat exchange pad 22, and the flow channel 222 may be configured to accommodate the cooling fluid to exchange heat between the cooling fluid and the battery cell 21. Optionally, the flow channel 222 may be formed directly on a surface of the heat exchange pad 22 when the heat exchange pad 22 is prepared, or the flow channel 222 may be formed by providing a groove on the heat exchange pad 22 after the heat exchange pad 22 has been prepared. When the heat exchange pad 22 is disposed between two adjacent battery cells 21, the flow channel 222 may be provided on a surface that is of the heat exchange pad 22 and that faces the battery cells 21, or may alternatively be provided on two surfaces that are of the heat exchange pad 22 and that face the battery cells 21. In some embodiments, in a thickness direction Y of the heat exchange pad 22, a projection area of the flow channel 222 may be greater than or equal to half of a projection area of the heat exchange pad 22, so as to achieve a better cooling effect. In another embodiment of this application, the projection area of the flow channel 222 may alternatively be less than half of the projection area of the heat exchange pad 22, and this is not limited in this application.

In technical solutions of this embodiment of this application, when temperatures of one or more battery cells 21 are abnormal, the cooling fluid can be delivered to the flow channel 222 of the heat exchange pad 22 through the cooling pipe 23. The cooling fluid in the flow channel 222 exchanges heat with the battery cells 21 and absorbs heat to vaporize, taking away the heat released when the temperatures of the battery cells 21 are abnormal, so as to rapidly cool down the battery cells 21. This further prevents the battery cells 21 in thermal runaway from catching fire or exploding, or even thermal runaway from spreading to adjacent battery cells 21, so as to ensure overall safety of the battery 2.

In some embodiments of this application, still refer to FIG. 7. The flow channel 222 includes a first flow channel **222*a* disposed in a length direction X of the heat exchange pad 22 and a second flow channel 222*b* disposed in a height direction Z of the heat exchange pad 22. In addition, the length direction X is perpendicular to a height direction Z, and the first flow channel 222*a* communicates with the second flow channel 222*b***.

The first flow channel **222*a* is disposed in the length direction X of the heat exchange pad 22, and is configured to deliver and diffuse the cooling fluid along the length direction X of the heat exchange pad 22. The second flow channel 222*b* is disposed in the height direction Z of the heat exchange pad 22, and is configured to deliver and diffuse the cooling fluid along the height direction Z of the heat exchange pad 22. The flow channels are disposed in both the length direction X and the height direction Z of the heat exchange pad 22, so that the cooling fluid can be delivered to most regions of the heat exchange pad 22, thereby enlarging a heat exchange area. In some embodiments of this application, when the first flow channel 222*a* communicates with the inlets 221 of the heat exchange pad 22, a plurality of second flow channels 222*b* may be disposed in a height direction Z and communicate with the first flow channel 222*a*, and the cooling fluid flows through the first flow channel 222*a* and is divided into the plurality of second flow channels 222*b*. In some embodiments, the second flow channel 222*b* may alternatively communicate with the inlet 221 of the heat exchange pad 22, a plurality of first flow channels 222*a* are provided and communicate with the second flow channel 222*b*, and the cooling fluid flows through the second flow channel 222*b* and is divided into the plurality of first flow channels 222*a*. In some other embodiments of this application, the first flow channel 222*a* and the second flow channel 222*b* may be disposed in another manner, and this is not limited in this application. It should be noted herein that, the length direction X and the height direction Z of the heat exchange pad 22** are perpendicular to each other, where the "perpendicular" is not in a strict sense, but an angle formed by the two directions is close to 90 degrees.

In some embodiments, the first flow channel **222*a* and the second flow channel 222*b* may be disposed straight or curved. Alternatively, one of the first flow channel 222*a* and the second flow channel 222*b* is disposed straight, and the other flow channel is disposed curved. The flow channel 222 is disposed straight, so that the cooling fluid can pass through rapidly, and a direction change of the fluid in the flow channel 222 is reduced. The flow channel 222 is disposed curved, so that a larger heat exchange area is beneficially formed, and a length of the flow channel 222** can be increased, so as to increase a cooling time.

In some embodiments of this application, still refer to FIG. 7. The flow channel 222 includes a plurality of second flow channels **222*b*, and the plurality of second flow channels 222*b* are spaced apart in the length direction X of the heat exchange pad 22**.

On the basis of the second flow channel **222*b* communicating with the first flow channel 222*a*, the plurality of second flow channels 222*b* may be spaced apart in the length direction X of the heat exchange pad, so that as many regions as possible for heat exchange of the cooling fluid may be provided on the heat exchange pad 22. The plurality of second flow channels 222*b* are spaced apart so that the regions on the heat exchange pad 22 for heat exchange may be distributed evenly, so as to cool down the whole battery cell 21. In addition, part of the structure on the periphery of each second flow channel 222*b* can be retained to support the second flow channel 222*b*. When the battery cell 21 swells, the heat exchange pad 22 is not easily compressed to the second flow channel 222*b* under the action of the swelling force to block the second flow channel 222*b*, thereby not affecting the cooling effect of the heat exchange pad 22**.

Figure 8:
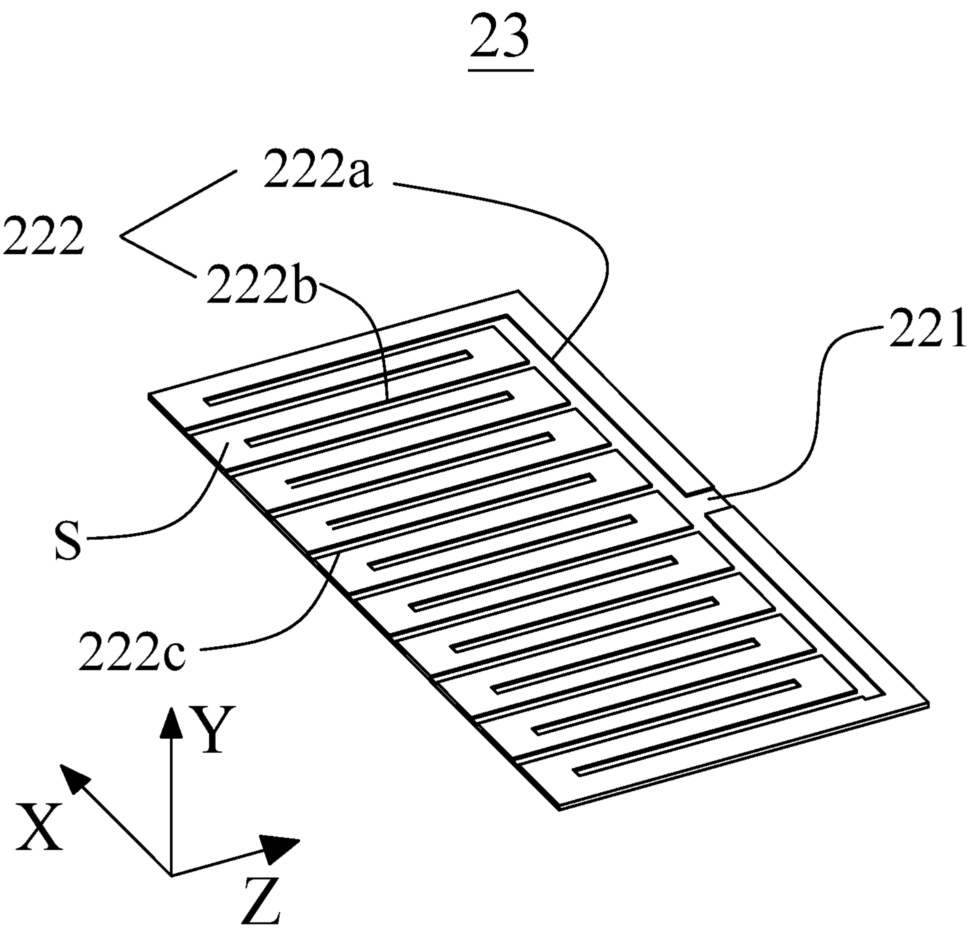
FIG. 8 is a schematic structural diagram of a heat exchange pad according to some other embodiments of this application.

In some embodiments of this application, refer to FIG. 8. FIG. 8 is a schematic structural diagram of the heat exchange pad 22 according to some other embodiments of this application. An exhaust channel **222*c* is provided between two adjacent second flow channels 222*b*, and the exhaust channel 222*c*** is configured to exhaust gas formed when the cooling fluid is vaporized.

Different from the first flow channel **222*a* and the second flow channel 222*b*, the exhaust channel 222*c* is a channel configured to exhaust gas formed when the cooling fluid is vaporized. As shown in FIG. 8, the exhaust channel 222*c* may not communicate with the first flow channel 222*a* and the second flow channel 222*b*, and the gas diffuses naturally in the heat exchange pad 22 into the exhaust channel 222*c*, and finally is exhausted. Optionally, the exhaust channel 222*c* may partially communicate with the first flow channel 222*a* or the second flow channel 222*b*. For example, the exhaust channel 222***c* may have a through hole communicating with an upward end of the second flow channel 222*b* so that the gas in the second flow channel 222*b* formed after heat absorption and vaporization of the cooling fluid may rise and enter the exhaust channel 222*c*, and finally is exhausted.

In some embodiments of this application, still refer to FIG. 7 and FIG. 8. In the height direction Z of the heat exchange pad 22, the first flow channel 222*a* is provided on a side of the second 222*b* close to the cooling pipe 23, and the first flow channel 222*a* communicates with the inlet of the heat exchange pad 22.

The first flow channel 222*a* is disposed in the length direction X of the heat exchange pad 22. After flowing into the first flow channel 222*a* through the inlet 221 of the heat exchange pad 22, the cooling fluid can flow along the first flow channel 222*a* and cover the length direction X of the battery cell 21, and flows through the first flow channel 222*a* and into the second flow channel 222*b* that is disposed in the height direction Z of the heat exchange pad 22. The flow channels are arranged in such a way that a cooling process of the cooling fluid can occur at various locations of the battery cell 21 along the length direction X, thereby improving an overall cooling effect.

Figure 9:
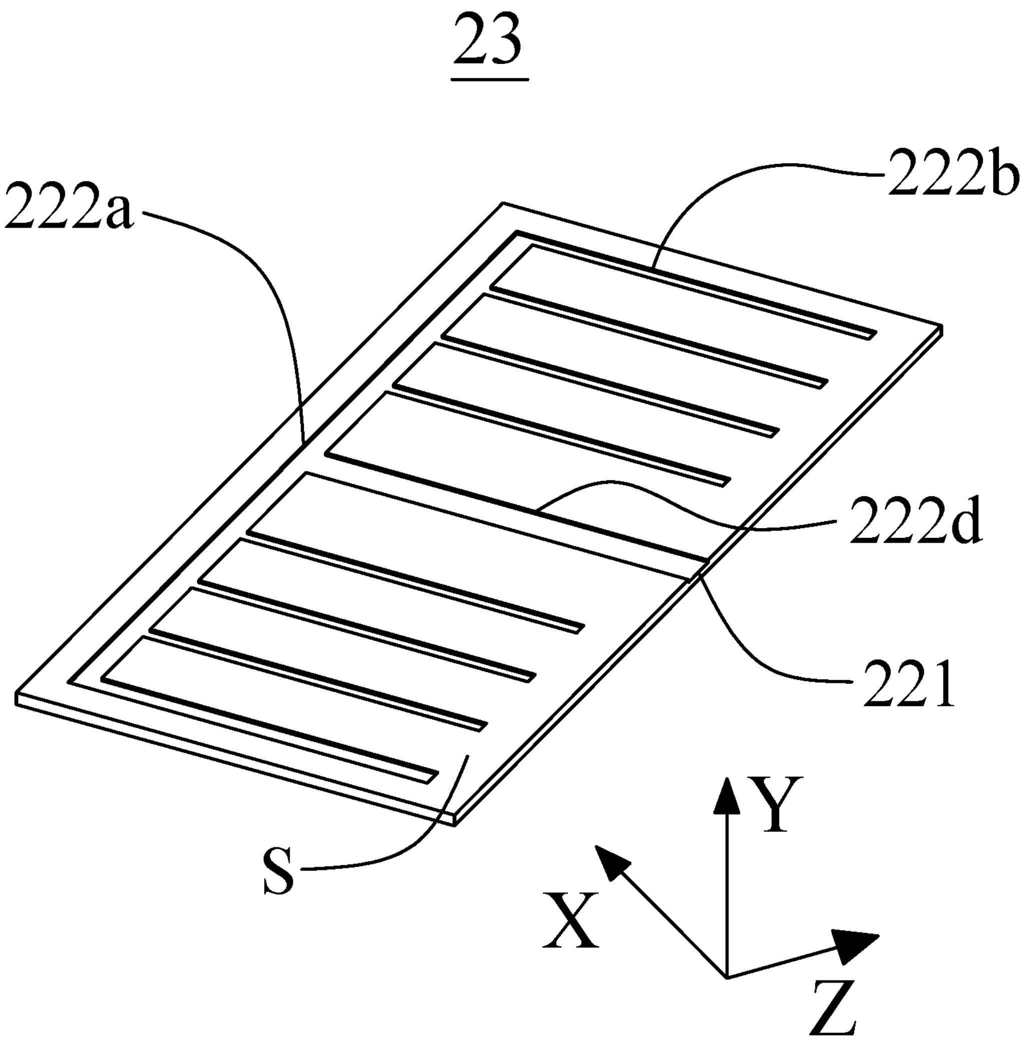
FIG. 9 is a schematic structural diagram of a heat exchange pad according to some other embodiments of this application; and In the accompanying drawings, the figures are not necessarily drawn to scale.

In some embodiments of this application, refer to FIG. 9. FIG. 9 is a schematic structural diagram of the heat exchange pad 22 according to some other embodiments of this application. The flow channel 222 further includes a third flow channel 222*d* disposed in the height direction Z of the heat exchange pad 22. In the height direction Z of the heat exchange pad 22, the third flow channel 222*d* is provided on a side of the first flow channel 222*a* close to the cooling pipe 23, and communicates with the inlet 221 of the heat exchange pad 22, and the cooling fluid flows into the first flow channel 222*a* from the third flow channel 222*d*.

The third flow channel 222*d* is configured to deliver the cooling fluid into the first flow channel 222*a* from the inlet 221, and the third flow channel 222*d* and that of the second flow channel 222*b* are arranged in a same direction, both in the height direction Z of the heat exchange pad 22. In some embodiments, the heat exchange pad 22 may be provided with the second flow channels 222*b* spaced apart in the length direction X, and the third flow channel 222*d* may be disposed between the plurality of the second flow channels 222*b*. The cooling fluid flows in a direction to the first flow channel 222*a* from the third flow channel 222*d*, and flows into the second flow channel 222*b* from the first flow channel 222*a*. The flow channels are arranged in such a way that the heat exchange pad 22 may be distributed with flow channels as many as possible, so as to improve the cooling effect of the heat exchange pad 22.

In some embodiments, the third flow channel 222*d* can be a straight or curved flow channel with a sectional shape not limited, and a sectional size may be determined based on a cooling requirement for the battery cell 21.

In some embodiments of this application, the heat exchange pad 22 may include a plurality of through holes, and at least some through holes are disposed in a periphery of the flow channel 222.

The heat exchange pad 22 may be a porous structure with a plurality of through holes (not shown in the figure), so that the cooling fluid can diffuse and penetrate through the through holes in the heat exchange pad 22. The through holes here may refer to a large number of directional or random holes scattered inside the heat exchange pad 22, and the holes may be foam-type, lotus-type, honeycomb-type, and so on. The heat exchange pad 22 with the plurality of through holes can be made of a porous material, such as porous ceramics and porous rubber. The heat exchange pad 22 has the structure with the plurality of through holes so that the cooling fluid can diffuse and penetrate in the heat exchange pad 22, thereby increasing a contact area between the cooling fluid and the battery cells 21. This makes the heat exchange between the cooling fluid and the battery cells 21 more sufficient and faster, helping improve the cooling effect on the battery cells 21.

Still refer to FIG. 7 to FIG. 9. In some embodiments of this application, the flow channel 222 is formed by recessing a surface S of the heat exchange pad 22 opposite the battery cell 21.

The surface S of the heat exchange pad 22 opposite the battery cell 21 refers to any of two surfaces of the heat exchange pad 22 that are arranged in the thickness direction Y. Because the heat exchange pad 22 is sandwiched between two adjacent battery cells 21, and the two surfaces of the heat exchange pad 22 that are arranged in the thickness direction Y are respectively opposite one of the adjacent battery cells 21, any surface S of the two surfaces may be recessed in a direction away from its opposite battery cell 21, to form the flow channel 222. Optionally, both surfaces may be recessed to form flow channels 222. In this way, the heat exchange pad 22 with flow channels 222 formed on both surfaces can exchange heat with the two battery cells 21 simultaneously through the cooling fluid in the flow channels 222 on both surfaces, thereby improving cooling efficiency.

When the surface S of the heat exchange pad 22 has been recessed to form the flow channel 222, a cover plate (not shown in the figure) can be provided on the recessed surface S to cover the heat exchange pad 22 in the thickness direction Y of the heat exchange pad 22, so that the flow channel 222 is closed in the thickness direction Y of the heat exchange pad 22 to reduce a probability of water vapor leaking out of the heat exchange pad 22. The cover plate and the heat exchange pad 22 may be connected by gluing, plugging, or another connection method. Optionally, after having its surface S recessed to form the flow channel 222, the heat exchange pad 22 may be directly sandwiched between the adjacent battery cells 21. With the battery cells 21 being clamped, the surface of the battery cell 21 facing the heat exchange pad 22 can close the flow channel 222 in the thickness direction Y of the heat exchange pad 22, so that the cooling fluid in the flow channel 222 is not likely to leak from the surface.

Refer to FIG. 6. In some embodiments of this application, the battery 2 further includes a flexible connector 24 configured to connect the outlet 231 of the cooling pipe 23 and the inlet 221 of the heat exchange pad 22.

The outlet 231 of the cooling pipe 23 and the inlet 221 of the heat exchange pad 22 are connected by using the flexible connector 24. The flexible connector 24 is a connector that allows its connecting parts to extend and contract in an axial direction, to bend over, and to produce a specific amount of displacement in a vertical direction. For example, the flexible connector 24 may be a rubber flexible joint, a clamp-type flexible joint, a corrugated pipe joint, or the like. When the battery cells 21 swell, causing the length of the whole part in the stacking direction Y of the battery cells 21 to change, locations corresponding to the outlet 231 of the cooling pipe 23 and the inlet 221 of the heat exchange pad 22 may shift. With the flexible connector 24 being used to connect the outlet 231 of the cooling pipe 23 and the inlet 221 of the heat exchange pad 22, when a shift occurs, the flexible connector 24 can, through its own deformation, adapt to the length change caused by the swelling of the battery cells 21, thereby ensuring a connection reliability between the outlet 231 of the cooling pipe 23 and the inlet 221 of the heat exchange pad 22.

Still refer to FIG. 6 to FIG. 9. In some embodiments of this application, the cooling pipe 23 is further provided with a thermal sensitive seal 232 for sealing the outlet 231. The thermal sensitive seal 232 is configured to be broken when a temperature of the battery cell 21 reaches a threshold, to communicate the outlet 231 with the inlet 221 and to allow the cooling fluid to flow into the flow channel 222 to cool the battery cell 21.

The thermal sensitive seal 232 is provided for sealing the outlet 231 of the cooling pipe 23. When the battery cell 21 functions normally, the thermal sensitive seal 232 can keep the outlet 231 sealed, and when the temperature of an adjacent battery cell 21 is abnormal, the thermal sensitive seal 232 can be broken due to the temperature, so that the outlet of the cooling pipe 23 is no longer sealed, and the cooling fluid flows into the flow channel 222 from the outlet of the cooling pipe 23 for cooling. The thermal sensitive seal 232 may be made of a polymer material or a low melting point metal. The polymer material includes polyethylene, polypropylene, polycarbonate, polyethylene terephthalate, and PFA (copolymer of a small amount of perfluoropropyl perfluorovinyl ether and polytetrafluoroethylene), and preferably the polypropylene with a low melting point is used. The low melting point metal includes zinc, tin, antimony, gallium, or their alloys, and preferably tin is used.

In some embodiments, the battery cell 21 is provided with an explosion-proof valve 211. The cooling pipe 23 can be disposed in a periphery of the explosion-proof valve 211, and the explosion-proof valve 211 is configured to be actuated when the temperature of the battery cell 21 reaches the threshold and break the thermal sensitive seal 232.

The explosion-proof valve 211 refers to a component that can be actuated and exhaust gas when the internal temperature of the battery cell 21 reaches the threshold. The exhausted gas is usually generated by uncontrolled chemical reactions of the battery cell 21 and therefore has a relatively high temperature. Therefore, when thermal runaway occurs in the battery cell 21, particularly when the explosion-proof valve 211 is opened to release pressure, a temperature near the explosion-proof valve 211 is higher than other regions of the battery cell 21. Based on this, the cooling pipe 23 is disposed in the periphery of the explosion-proof valve 211, that is, a region near the explosion-proof valve 211, so that heat released from the region may be used to break the thermal sensitive seal 232, to allow the cooling fluid to flow from the cooling pipe 23 for cooling.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A battery, comprising:

a plurality of battery cells;

a heat exchange pad that is disposed between two adjacent battery cells and exchanges heat with the battery cells; and a cooling pipe that is arranged on a top surface of each battery cell among the plurality of battery cells and that delivers cooling fluid along a central axis of the plurality of battery cells, the cooling pipe is provided with a plurality of outlets, the heat exchange pad is provided with inlets corresponding to the outlets, and the cooling pipe delivers the cooling fluid through the outlets to the inlets of the heat exchange pad, wherein a flow channel that communicates with the inlet is further provided on the heat exchange pad, and the flow channel accommodates the cooling fluid to exchange heat between the cooling fluid and the battery cells, and the central axis of the plurality of battery cells is perpendicular to a longitudinal axis of the each battery cell among the plurality of battery cells.

2. The battery according to claim 1, wherein;

the flow channel comprises a first flow channel disposed in a length direction of the heat exchange pad and a second flow channel disposed in a height direction of the heat exchange pad, wherein the length direction is perpendicular to the height direction, and the first flow channel communicates with the second flow channel.

3. The battery according to claim 2, wherein:

the flow channel comprises a plurality of second flow channels, and the plurality of second flow channels are spaced apart in the length direction of the heat exchange pad.

4. The battery according to claim 3, wherein;

at least one exhaust channel is sandwiched between two adjacent second flow channels among the plurality of second flow channels, and the at least one exhaust channel exhausts gas formed in response to the cooling fluid being vaporized.

5. The battery according to claim 2, wherein:

in the height direction of the heat exchange pad, the first flow channel is provided on a side that is of the second flow channel and that is close to the cooling pipe, wherein the first flow channel communicates with the inlets of the heat exchange pad.

6. The battery according to claim 2, wherein:

the flow channel further comprises a third flow channel disposed in a height direction of the heat exchange pad, and in the height direction of the heat exchange pad, the third flow channel is provided on a side that is of the first flow channel and that is close to the cooling pipe, wherein the third flow channel communicates with the inlets of the heat exchange pad, and the cooling fluid flows into the first flow channel through the third flow channel.

7. The battery according to claim 1, wherein;

the heat exchange pad comprises a plurality of through holes, and at least some of the through holes are provided on a periphery of the flow channel.

8. The battery according to claim 1, wherein;

the flow channel is an open groove recessed in a surface of the heat exchange pad, and a surface of an adjacent battery cell among the plurality of battery cells directly closes the open groove to form the flow channel.

9. The battery according to claim 1, wherein;

the battery further comprises a flexible connector, the flexible connector is selected from at least one of:

a rubber flexible joint, a flexible joint including a clamp, and a corrugated pipe joint; and the flexible connector connects the outlets of the cooling pipe and the inlets of the heat exchange pad.

10. The battery according to claim 1, wherein:

the cooling pipe is further provided with thermal sensitive seals for sealing the outlets, the thermal sensitive seal breaks in response to a temperature of the battery cells reaching a threshold, and the plurality of outlets are arranged downward from the cooling pipe to allow the cooling fluid to flow into the inlets of the heat exchange pad in a direction of gravity in response to the thermal sensitive seal breaking.

11. The battery according to claim 10, wherein:

the battery cell comprises an explosion-proof valve, the cooling pipe is disposed in a periphery of the explosion-proof valve, and the explosion-proof valve actuates in response to the temperature of the battery cell reaching the threshold and breaking the thermal sensitive seal.

12. An apparatus using a battery, the apparatus comprising:

a battery, including a plurality of battery cells;

a heat exchange pad that is disposed between two adjacent battery cells and exchanges heat with the battery cells; and a cooling pipe that is arranged on a top surface of each battery cell among the plurality of battery cells and that delivers cooling fluid along a central axis of the plurality of battery cells, the cooling pipe is provided with a plurality of outlets, the heat exchange pad is provided with inlets corresponding to the outlets, and the cooling pipe delivers the cooling fluid through the outlets to the inlets of the heat exchange pad, wherein a flow channel that communicates with the inlet is further provided on the heat exchange pad, and the flow channel accommodates the cooling fluid to exchange heat between the cooling fluid and the battery cells, and the central axis of the plurality of battery cells is perpendicular to a longitudinal axis of the each battery cell among the plurality of battery cells, and wherein the battery provides electric energy to the apparatus.

13. The apparatus according to claim 12, wherein:

the flow channel comprises a first flow channel disposed in a length direction of the heat exchange pad and a second flow channel disposed in a height direction of the heat exchange pad, wherein the length direction is perpendicular to the height direction, and the first flow channel communicates with the second flow channel.

14. The apparatus according to claim 13, wherein:

the flow channel comprises a plurality of second flow channels, and the plurality of second flow channels are spaced apart in the length direction of the heat exchange pad.

15. The apparatus according to claim 14, wherein:

at least one exhaust channel is sandwiched between two adjacent second flow channels among the plurality of second flow channels, and the at least one exhaust channel exhausts gas formed in response to the cooling fluid being vaporized.

16. The apparatus according to claim 13, wherein:

in the height direction of the heat exchange pad, the first flow channel is provided on a side that is of the second flow channel and that is close to the cooling pipe, wherein the first flow channel communicates with the inlets of the heat exchange pad.

17. The apparatus according to claim 13, wherein:

the flow channel further comprises a third flow channel disposed in a height direction of the heat exchange pad, and in the height direction of the heat exchange pad, the third flow channel is provided on a side that is of the first flow channel and that is close to the cooling pipe, wherein the third flow channel communicates with the inlets of the heat exchange pad, and the cooling fluid flows into the first flow channel through the third flow channel.

18. The apparatus according to claim 12, wherein:

the flow channel is an open groove recessed in a surface of the heat exchange pad, and a surface of an adjacent battery cell among the plurality of battery cells directly closes the open groove to form the flow channel.

19. The apparatus according to claim 12, wherein:

the cooling pipe is further provided with thermal sensitive seals for sealing the outlets, the thermal sensitive seal breaks in response to a temperature of the battery cells reaching a threshold, and the plurality of outlets are arranged downward from the cooling pipe to allow the cooling fluid to flow into the inlets of the heat exchange pad in a direction of gravity in response to the thermal sensitive seal breaking.

20. A battery, comprising:

a plurality of battery cells;

a heat exchange pad that is disposed between two adjacent battery cells and exchanges heat with the battery cells; and a cooling pipe that is arranged on a top surface of each battery cell among the plurality of battery cells and that delivers cooling fluid along a central axis of the plurality of battery cells, the cooling pipe is provided with a plurality of outlets, the heat exchange pad is provided with inlets corresponding to the outlets, and the cooling pipe delivers the cooling fluid through the outlets to the inlets of the heat exchange pad, wherein a flow channel that communicates with the inlet is an open groove recessed in a surface of the heat exchange pad, a surface of an adjacent battery cell among the plurality of battery cells directly closes the open groove to form the flow channel, and the flow channel accommodates the cooling fluid to exchange heat between the cooling fluid and the battery cells, the central axis of the plurality of battery cells is perpendicular to a longitudinal axis of the each battery cell among the plurality of battery cells, the cooling pipe is further provided with thermal sensitive seals for sealing the outlets, the thermal sensitive seal breaks in response to a temperature of the battery cells reaching a threshold, and the plurality of outlets are arranged downward from the cooling pipe to allow the cooling fluid to flow into the inlets of the heat exchange pad in a direction of gravity in response to the thermal sensitive seal breaking.

* * * * *